United States Patent
Sell et al.

(10) Patent No.: US 12,287,196 B2
(45) Date of Patent: Apr. 29, 2025

(54) SCANNING ELEMENT AND INDUCTIVE POSITION MEASURING DEVICE HAVING THIS SCANNING ELEMENT

(71) Applicant: DR. JOHANNES HEIDENHAIN GmbH, Traunreut (DE)

(72) Inventors: Oliver-Michael Sell, Traunreut (DE); Martin Heumann, Traunstein (DE); Marc Oliver Tiemann, Waging am See (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 252 days.

(21) Appl. No.: 18/143,181

(22) Filed: May 4, 2023

(65) Prior Publication Data
US 2023/0358523 A1    Nov. 9, 2023

(30) Foreign Application Priority Data
May 5, 2022   (EP) .................................... 22171709

(51) Int. Cl.
*G01B 7/00*     (2006.01)
*G01B 7/30*     (2006.01)
*G01D 5/20*     (2006.01)

(52) U.S. Cl.
CPC ............... *G01B 7/003* (2013.01); *G01B 7/30* (2013.01); *G01D 5/2053* (2013.01)

(58) Field of Classification Search
CPC ......... G01B 7/30; G01B 7/003; G01D 5/2053
See application file for complete search history.

(56) References Cited

U.S. PATENT DOCUMENTS

| | | | | |
|---|---|---|---|---|
| 6,111,402 A | * | 8/2000 | Fischer | G01D 5/2046 341/15 |
| 7,190,158 B2 | * | 3/2007 | Tiemann | G01D 5/2053 324/207.17 |
| 7,719,264 B2 | | 5/2010 | Tiemann | |

(Continued)

FOREIGN PATENT DOCUMENTS

| | | |
|---|---|---|
| DE | 19751853 A1 | 6/1998 |
| DE | 10320990 A1 | 11/2004 |

(Continued)

OTHER PUBLICATIONS

European Search Report issued in EP Patent Application No. 22171709.3 dated Oct. 18, 2022, pp. 1-2.

*Primary Examiner* — Eman A Alkafawi
*Assistant Examiner* — Suresh K Rajaputra
(74) *Attorney, Agent, or Firm* — Carter, DeLuca & Farrell LLP

(57) ABSTRACT

A scanning element, for measuring a position along a measuring direction, includes a multilayer printed circuit board. The printed circuit board has a first receiver track that includes a first receiver circuit trace. The printed circuit board also has a connecting line that includes a first conductor trace and a second conductor trace, the connecting line crossing the first receiver track. In at least one first section of the connecting line, the first conductor trace is arranged offset to the second conductor trace in the positive measuring direction, and, in at least one second section of the connecting line, the second conductor trace is arranged offset to the first conductor trace in the positive measuring direction.

20 Claims, 5 Drawing Sheets

(56) References Cited

U.S. PATENT DOCUMENTS

| | | |
|---|---|---|
| 10,645,810 B2 | 5/2020 | Rissing |
| 11,099,035 B2 | 8/2021 | Eder |
| 2008/0018328 A1 | 1/2008 | Meyer |

FOREIGN PATENT DOCUMENTS

| | | |
|---|---|---|
| DE | 102006046531 A1 | 4/2008 |
| DE | 102017219931 A1 | 8/2018 |
| EP | 1881299 B1 | 5/2014 |
| EP | 3702737 B1 | 5/2021 |

\* cited by examiner

SCANNING ELEMENT AND INDUCTIVE POSITION MEASURING DEVICE HAVING THIS SCANNING ELEMENT

CROSS-REFERENCE TO RELATED APPLICATIONS

The present application claims priority to Application No. 22171709.3, filed in the European Patent Office on May 5, 2022, which is expressly incorporated herein in its entirety by reference thereto.

FIELD OF THE INVENTION

The present invention relates to a scanning element, e.g., for an inductive position measuring device for determining the position of the scanning element relative to a scale element, and to a position measuring device that includes such a scanning element.

BACKGROUND INFORMATION

Inductive position measuring devices are used, for example, as angle measuring devices to determine the angular position of machine parts that can be rotated relative to one another. In inductive position measuring devices, excitation tracks and receiver tracks, for example, in the form of conductive traces, are applied to a common, usually multilayer, printed circuit board, which is firmly connected, for example, to a stator of an angle measuring device. Opposite this printed circuit board is a scale element on which graduation structures are applied and which is connected to the rotor of the angle measuring device in a rotationally fixed manner. When a time-varying electrical excitation current is applied to the excitation circuit traces, signals dependent on the angular position are generated in the receiver coils during the relative rotation between the rotor and stator. These signals are then further processed in an evaluation electronic system.

Such inductive angle measuring devices are used as measuring instruments for electrical drives to determine the relative movement or the relative position of corresponding machine parts. For example, the generated angle position values are fed to a subsequent electronic system for controlling the drives via a corresponding interface arrangement.

Furthermore, inductive position measuring devices are also frequently used for direct measurement of longitudinal displacements along an axis. The same measuring principle is used as for the angle measuring devices mentioned above, but the receiver coils and the graduation structure extend along the longitudinal axis.

A position measuring device is described in European Patent Document No. 1 881 299 and includes two receiver tracks. Connecting lines are fed to the outside on both sides of the respective receiver tracks.

European Patent Document No. 3 702 737 describes an inductive position measuring device with two receiver tracks, in which connecting lines are fed through a gap in the outer receiver track.

SUMMARY

Example embodiments of the present invention provide an accurately operating, compact, and inexpensively producible scanning element for an inductive position measuring device.

According to an example embodiment of the present invention, a scanning element, which is, for example, adapted for use in an inductive position measuring device for measuring a position along a measuring direction, includes a printed circuit board having a first layer and a second layer. In addition, the printed circuit board has a first receiver track that includes at least one first receiver circuit trace and at least one connecting line having a first conductor trace and a second conductor trace. The connecting line crosses or traverses the first receiver track. Furthermore, the printed circuit board has a second receiver track that includes at least one second receiver circuit trace. The first conductor trace is electrically connected to the second receiver circuit trace at a (e.g., first) point, and the second conductor trace is electrically connected to the second receiver circuit trace at another (e.g., second) point, so that a signal received by the second receiver circuit trace can be tapped using the conductor traces. Alternatively or in addition, the printed circuit board has a first excitation circuit trace, in which the first conductor trace is electrically connected to the first excitation circuit trace at a (e.g., third) point, and the second conductor trace is electrically connected to the first excitation circuit trace at another (e.g., fourth) point, so that an excitation current can be introduced into the first excitation circuit trace via the first conductor trace and via the second conductor trace. In at least one first section of the connecting line, the first conductor trace is arranged offset to the second conductor trace in the positive measuring direction, and, in at least one second section of the connecting line, the second conductor trace is arranged offset to the first conductor trace in the positive measuring direction.

The measuring direction may be a linear direction, a circumferential direction, or a tangential direction. For example, a positive measuring direction for a linear measurement may be considered as a direction (e.g., relative displacement) to the left and, accordingly, a negative measuring direction may be considered as the direction to the right. For example, for measuring an angular position, i.e., in the circumferential direction, the positive measuring direction may be a measuring direction in the clockwise direction, and the negative measuring direction may be a measuring direction in the counterclockwise direction. For example, the first excitation circuit trace extends along the circumferential direction or along the measuring direction.

For example, the first receiver track, the second receiver track, and the first excitation circuit trace extend along the circumferential direction or along the measuring direction.

According to example embodiments, the (e.g., first) point at which the first conductor trace is electrically connected to the second receiver circuit trace is located in the first layer of the printed circuit board, and the other (e.g., second) point at which the second conductor trace is electrically connected to the second receiver circuit trace is located in the second layer of the printed circuit board. Alternatively or in addition, the (e.g., third) point at which the first conductor trace is electrically connected to the first excitation circuit trace is located in the first layer of the printed circuit board and the other (e.g., fourth) point at which the second conductor trace is electrically connected to the first excitation circuit trace is located in the second layer of the printed circuit board.

According to example embodiments, in the first section, the first receiver circuit trace and the first or second conductor trace are arranged in parallel to one another in sections in the same layer of the printed circuit board. Alternatively or in addition, in the second section, the first receiver circuit trace and the first or second conductor trace are arranged parallel to one another in sections in the same layer of the printed circuit board.

For example, in at least one third section of the connecting line, the first conductor trace in the first layer and the second conductor trace in the second layer are arranged to extend one above the other. The phrase one above the other should be understood as meaning that the conductor traces are arranged one above the other with parallel oaths in a direction orthogonal to the printed circuit board.

According to example embodiments, in the first section and/or in the second section, the first conductor trace and the second conductor trace are arranged in parallel to one another in sections. For example, the first receiver circuit trace may extend, e.g., centrally, between the parallel-extending first and second conductor traces in the same layer as the conductor traces.

For example, the path of the first conductor trace and the path of the second conductor trace in the first section and/or in the second section change from the first layer to the second layer.

According to example embodiments, the first conductor trace in the first section extends along a subsection in the first layer, and the first receiver circuit trace also extends in the first layer in this section. In this subsection, the first conductor trace extends parallel to the first receiver circuit trace. Optionally, the first receiver track includes a further first receiver circuit trace extending in the first subsection in the second layer, and the first conductor trace crosses the further first receiver circuit trace in the subsection.

A printed circuit board layer should be understood to be an electrically conductive layer or coating. The printed circuit board may be arranged as a rigid printed circuit board with, for example, an FR4 core. Alternatively, the printed circuit board may be arranged as a thin flexible printed circuit board or conductive foil, e.g., based on polyimide films. The printed circuit board may have a thickness of less than 1 mm, e.g., less than 500 μm, less than 200 μm, etc. Particularly if the printed circuit board is thin, it may be mounted on a comparatively strong metal substrate.

For example, the first excitation circuit trace may be energized with an excitation current having a time-varying current intensity (alternating current or mixed current). The excitation current may be generated with the aid of electronic components, which means that its characteristic may be shaped by the electronic components. Since there is a physical relationship between the current and the voltage, the same consideration may be made for the excitation voltage. The electronic components may be mounted on the printed circuit board. For example, the signals that can be generated by the first receiver track and the second receiver track may be further processed with the aid of the electronic components, e.g., which form an evaluation circuit.

The electronic components may be arranged as components of different electronic circuits or may be assigned to different circuits. For example, certain electronic components may be arranged as components of the circuit for generating an excitation current, or further electronic components may be components of a further circuit for evaluating or further processing signals.

According to example embodiments, the printed circuit board has exactly two layers. For example, the scanning element may have a substrate on which the printed circuit board is arranged or applied.

For example, the substrate is produced from a metallic material, e.g., arranged as a sheet. For example, the substrate may be produced from a soft magnetic material.

According to example embodiments, the first receiver track and the second receiver track are arranged curved about an axis. The first receiver track is arranged radially outward relative to the second receiver track with respect to the axis. Such a scanning element is used, for example, to determine an angular position. For example, the first receiver track and the second receiver track may extend around the axis over 3600 without any gaps.

According to an example embodiment of the present invention, an inductive position measuring device includes a scanning element as described herein and a scale element. The scale element is spaced apart from the printed circuit board in a direction oriented orthogonally to the measuring direction.

Further features and aspects of example embodiments of the present invention are described in further detail below with reference to the appended schematic Figures.

DETAILED DESCRIPTION

Figure 1:
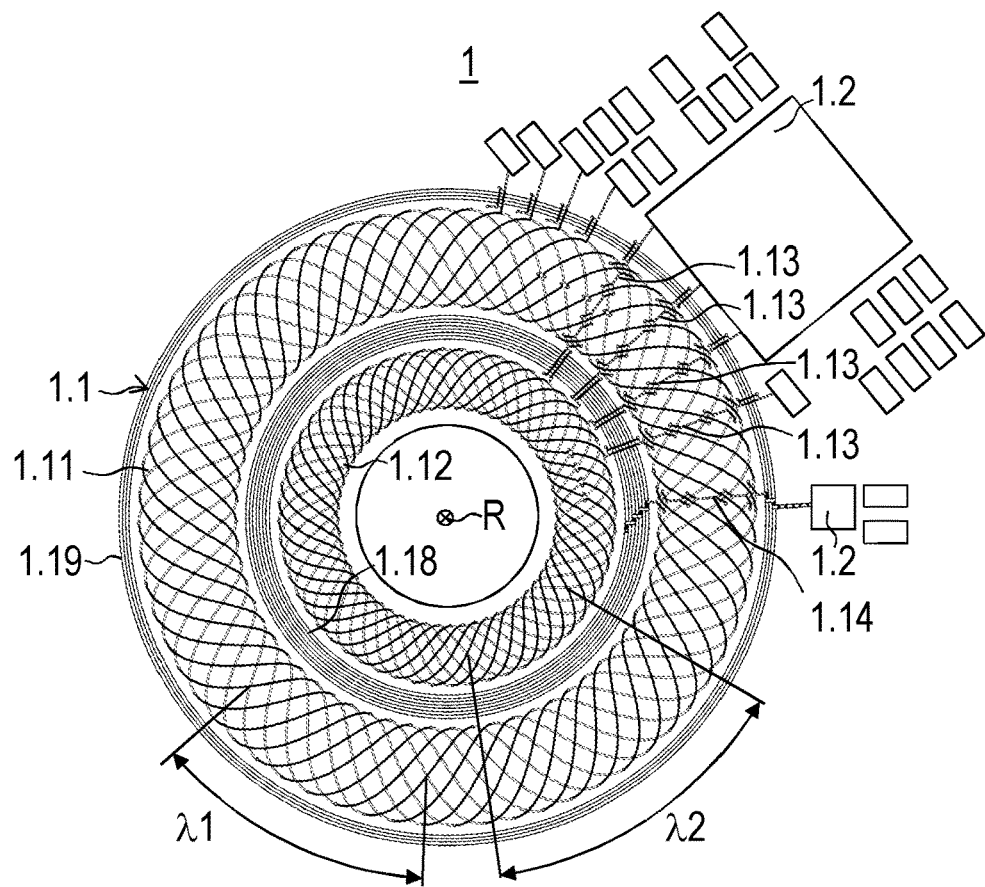
FIG. 1 is a top view of one side of a scanning element.
Figure 2:
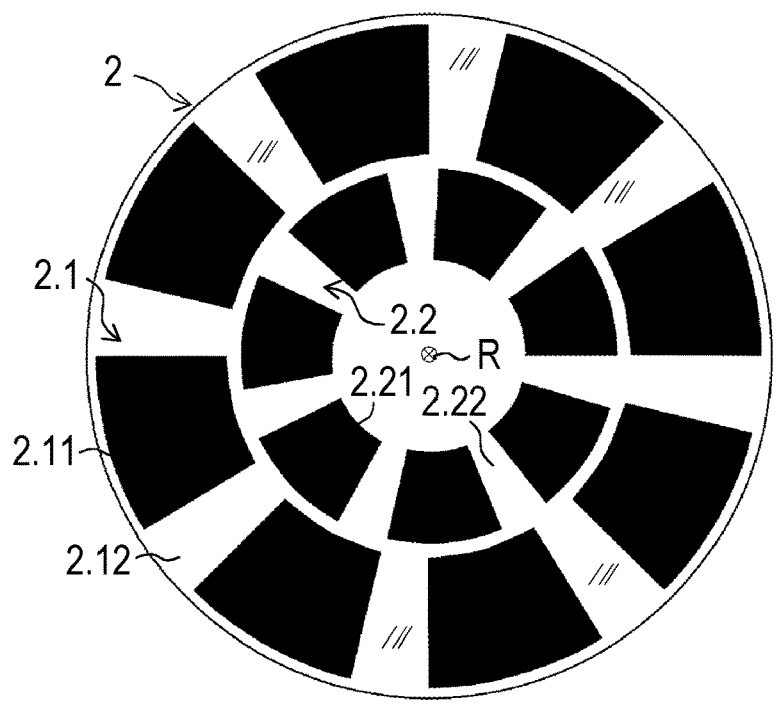
FIG. 2 is a top view of one side of a scale element.

FIGS. 1 and 2 illustrate a position measuring device having a scanning element 1 that may be used to measure an angular position relative to a scale element 2. In the assembled state of the position measuring device, the scale element 2 is rotatably arranged about an axis R relative to the scanning element 1. The axis R is oriented orthogonally to the drawing plane of FIGS. 1 and 2. The position measuring device may be used to determine the position in the measuring direction U (e.g., the circumferential direction), i.e., an angular position. A positive measuring direction U+ is oriented clockwise, and a negative measuring direction U− is oriented counterclockwise.

Figure 3:
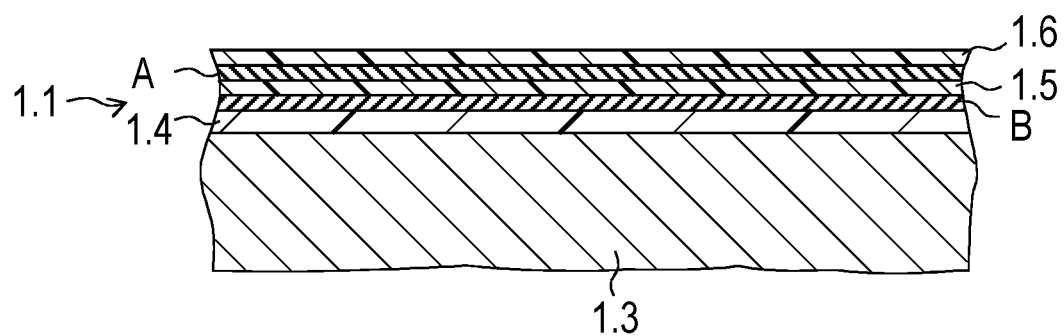
FIG. 3 a cross-sectional view of a portion of the scanning element.

The scanning element 1 includes a printed circuit board 1.1, which, as illustrated in FIG. 3, has a plurality of layers A, B, e.g., exactly two layers A, B. For example, the printed circuit board 1.1 is very thin with a thickness of approximately 100 μm, which is why it can also be referred to as a film. For mechanical reinforcement, the printed circuit board 1.1 is applied here to a comparatively thick substrate 1.3, which may be formed of, for example, a metallic material. An electrically insulating layer 1.4 with a thickness of about 50 μm is arranged on the substrate, on which the second layer B is applied. A further insulating layer 1.5, e.g., approximately 15 μm thick, is located between the second layer B and the first layer A. An insulating layer 1.6, which is also approximately 15 μm thick, is located on the layer A. The two layers A, B are each approximately 12 μm thick. For example, the insulating layers 1.4, 1.5, 1.6 are made of polyimide. The scanning element 1 is used to scan the scale element 2.

The printed circuit board 1.1 includes a first (e.g., inner) excitation circuit trace 1.18 and a second excitation circuit trace 1.19. The excitation circuit traces 1.18, 1.19 are arranged in the first layer A and in the second layer B.

A first receiver track 1.11 and a second receiver track 1.12 are arranged on the printed circuit board 1.1 to determine the angle information. The excitation circuit traces 1.18, 1.19 surround the second receiver track 1.12 and the first receiver track 1.11 and extend along the measuring direction U, and along the circumferential direction.

For example, each of the receiver tracks 1.11, 1.12 includes respective receiver circuit traces 1.111, 1.121 (see FIG. 4, for example), which are arranged offset in the circumferential direction, so that they provide four phase-shifted signals in accordance with the offset. The receiver circuit traces 1.111, 1.121 that belong to one and the same receiver track 1.11, 1.12 are indicated by only one reference sign. Thus, for example, all receiver circuit traces 1.111 of the first receiver track 1.11 are indicated by only one reference sign. In addition, the first receiver circuit traces 1.111 of the first receiver track 1.11 are connected with vias in the different layers A, B of the printed circuit board 1.1 so that undesired short circuits are avoided at crossing points. The same applies to the receiver circuit traces 1.121 of the second receiver track 1.12. Although each of the first and second receiver circuit traces 1.111, 1.121 includes several conductive segments, each of which is distributed and connected together in two planes or layers A, B, such a structure is collectively referred to as a receiver circuit trace 1.111, 1.121. In FIGS. 4 to 9, the conductive traces in the areas where conductive traces are located only in the first layer A are illustrated in black. In addition, conductive traces in the areas where conductive traces are located only in the second layer B are illustrated in white with a black border line. Conductive traces in the areas where conductive traces are located one above the other in the first layer A and in the second layer B are illustrated dashed in black and white.

The receiver circuit traces 1.111, 1.121 have a spatially periodic path that is substantially sine-shaped or sinusoidal. The receiver circuit traces 1.111 of the first receiver track 1.11 have a period length λ1 (see, e.g., FIG. 1), while the receiver circuit traces 1.121 of the second receiver track 1.12 have a period length λ2. For example, within a receiver track 1.11, 1.12, adjacent receiver circuit traces 1.111, 1.121 are arranged offset from one another by ⅛ of the full sine period (by λ/4 or 45° along the circumferential direction or measuring direction U). The receiver circuit traces 1.111, 1.121 are electrically connected such that they provide 0° and 90° signals, on the one hand, and 45° and 135° signals, on the other. A first position signal may be determined from the 0° and 90° signals, and a second position signal, redundant with respect to the first position signal, may be determined from the 450 and 135° signals.

For embodiment, the second period length λ2 is smaller than the first period length λ1 (e.g., λ2/λ1=⅞).

The scanning element 1 has an electronic circuit including a plurality of electronic components 1.2. For example, the electronic circuit also includes an ASIC component.

The signals received by the second receiver track 1.12 are transmitted to the electronic circuit, e.g., to an evaluation circuit thereof. For this purpose, there are four connecting lines 1.13 on the printed circuit board, each of which has a first conductor trace 1.131 and a second conductor trace 1.132.

Figure 4:
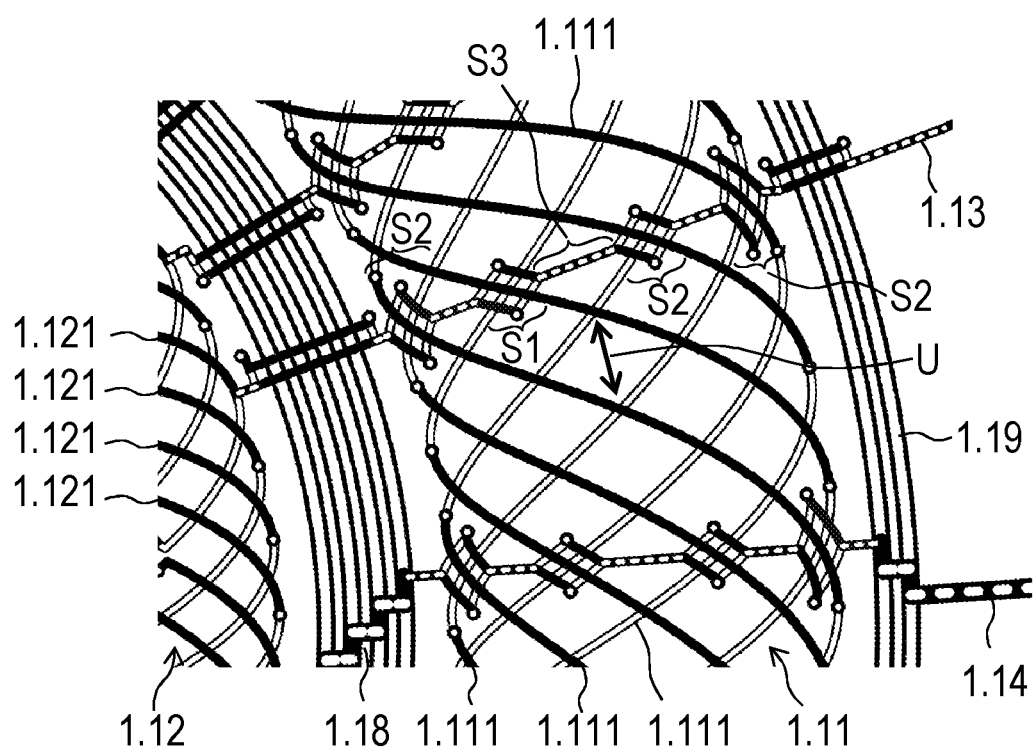
FIG. 4 is an enlarged view of the scanning element with connecting lines.

The first conductor trace 1.131 (see, e.g., FIG. 5) is electrically connected to or electrically contacts the second receiver circuit trace 1.121 at a first point, for example, at a first end of the second receiver circuit trace 1.121 (see, e.g., FIG. 4). The first point is located in the first layer A of the printed circuit board 1.1. In addition, the second conductor trace 1.132 is electrically connected to or electrically contacts the second receiver circuit trace 1.121 at another second point, for example, at a second end of the second receiver circuit trace 1.121. This other second point is located in the second layer B of the printed circuit board 1.1. For example, the first point of the first conductor trace 1.131 and the other second point of the second conductor trace 1.132 are located one above the other in the layer stack of the printed circuit board 1.1. This type of contacting allows received signals to be tapped in the form of electrical voltage at the ends of the receiver circuit trace 1.121.

To allow for the excitation current to be supplied to the first excitation circuit trace 1.18, the printed circuit board 1.1 also has a further connecting line 1.14, which includes a first conductor trace 1.141 and a second conductor trace 1.142. The first conductor trace 1.141 is electrically connected to or contacts the first excitation circuit trace 1.18 at a third point, for example, at a first end of the first excitation circuit trace 1.18. The third point is located in the first layer A of the printed circuit board 1.1. In addition, the second conductor trace 1.142 is electrically connected to or contacts the first excitation circuit trace 1.18 at another fourth point, for example, at a second end of the first excitation circuit trace 1.18. The fourth point is located in the second layer B of the printed circuit board 1.1. For example, the third point of the first conductor trace 1.141 and the fourth point of the second conductor trace 1.142 are located one above the other. With this configuration, the first excitation circuit trace 1.18 is supplied with the excitation current.

The connecting lines 1.13, 1.14 cross the first receiver track 1.11. In this context, it is important that, as far as possible, the connecting line 1.13 to the second receiver track 1.12 does not pick up any interfering signals that could be received when the first receiver track 1.11 is crossed. Additionally, it should be prevented that the excitation currents for the first excitation circuit trace 1.18 flowing through the connecting lines 1.14 cause significant interferences in the first receiver track 1.11.

Figure 5:
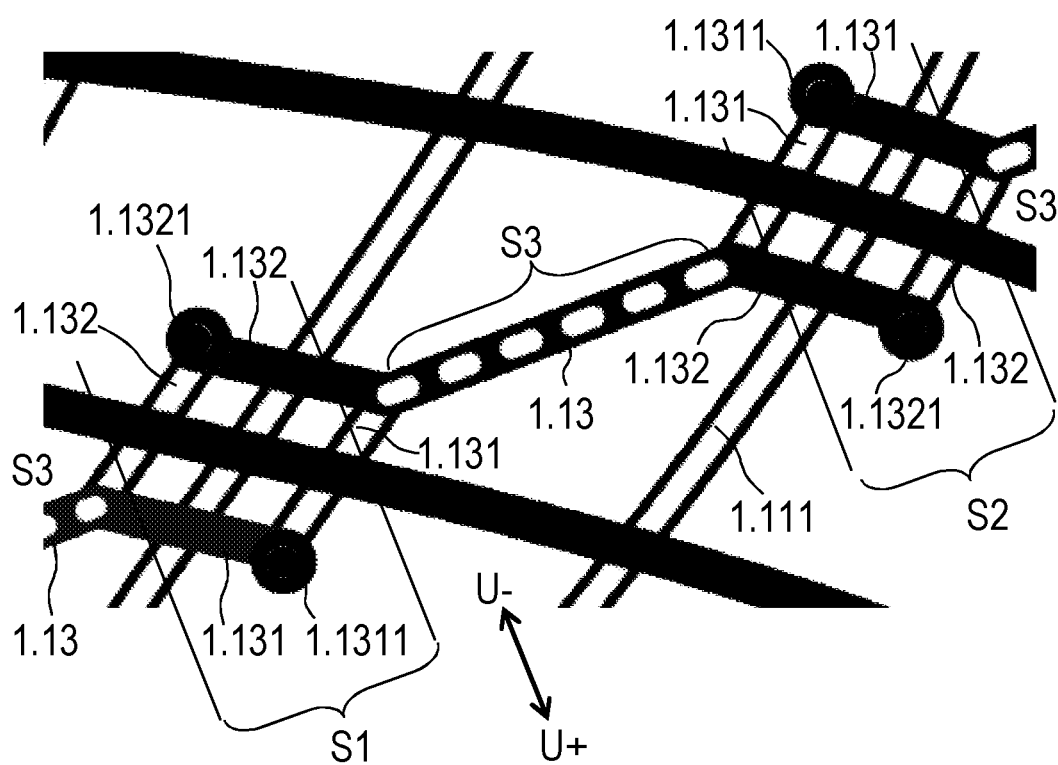
FIG. 5 is an enlarged view of one of the connecting lines.

Thus, the path of the connecting line 1.13 is arranged such that, as illustrated in FIG. 5, in a first section S1, the first conductor trace 1.131 is arranged offset from the second conductor trace 1.132 in the positive measuring direction U+. In addition, in a second section S2 of the connecting line 1.13, the second conductor trace 1.132 is arranged offset from the first conductor trace 1.131 in the positive measuring direction U+. Moreover, for example, in third sections S3 of the connecting line 1.13, the first conductor trace 1.131 and the second conductor trace 1.132 are arranged one above the other in the first layer A and in the second layer B. Thus, the conductor traces 1.131, 1.132 are arranged in sections in the first layer A and in sections in the second layer B. The change between the layers A, B is made in the first conductor trace 1.131 by vias 1.1311 and in the second conductor trace 1.132 by vias 1.1321.

Figure 6:
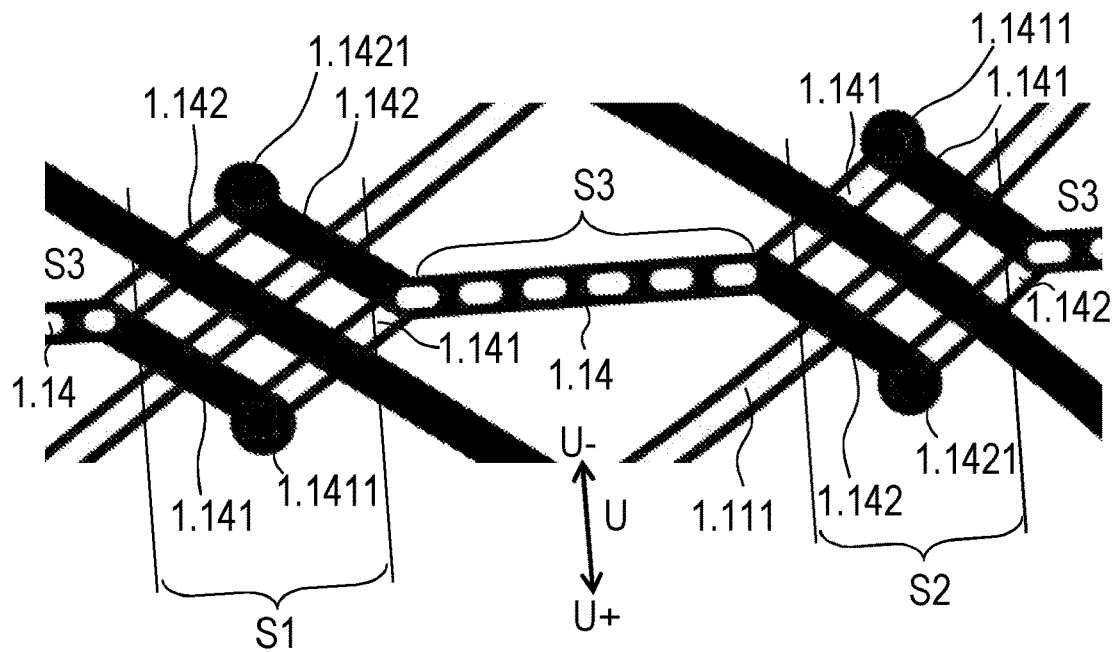
FIG. 6 is an enlarged view of another connecting line.

FIG. 6 illustrates the path of connecting line 1.14 that connects the first excitation circuit trace 1.18. In a first section S1, the first conductor trace 1.141 is arranged offset from the second conductor trace 1.142 in the positive measuring direction U+. In addition, in a second section S2 of the connecting line 1.14, the second conductor trace 1.142 is arranged offset from the first conductor trace 1.141 in the positive measuring direction U+. Moreover, for example, in third sections S3 of the connecting line 1.14, the first conductor trace 1.141 and the second conductor trace 1.142 are arranged one above the other in the first layer A and in the second layer B. This means that the first conductor trace 1.141 and the second conductor trace 1.142 are arranged one above the other in a direction orthogonal to the printed circuit board 1.1. The third sections S3 extend in total over the largest part of the length of the connecting line 1.14.

Figure 7:
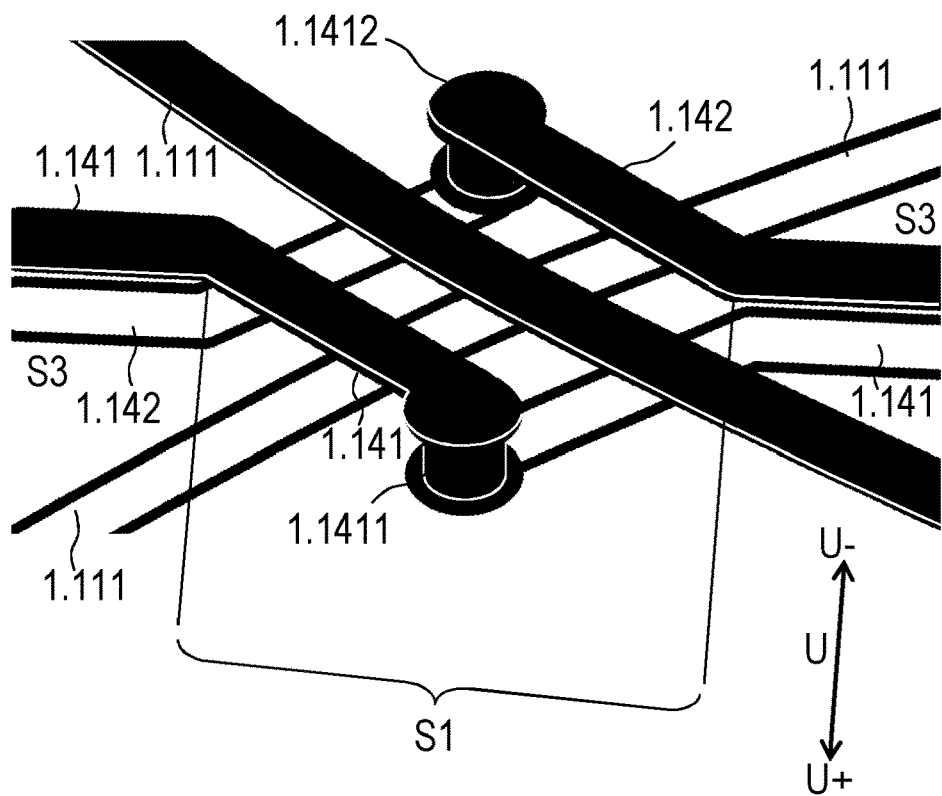
FIG. 7 is an enlarged perspective view of the connecting line.

FIG. 7 is a perspective view of the paths of the first and second conductor traces 1.141, 1.142. Coming from the left in this Figure, first the first conductor trace 1.141 in the first layer A of the printed circuit board 1.1 and the second conductor trace 1.142 in the second layer B are arranged one above the other in a section S3. This arrangement, which is not susceptible to interference, cannot be maintained in the further path because the connecting line 1.14 must cross the first receiver track 1.11. Thus, the paths of the first and second receiver track 1.141, 1.142 are initially changed such that they are aligned in both layers A, B along a subsection parallel to the first receiver circuit traces 1.111 in the same layer A, B. In this subsection, the first conductor trace 1.141 crosses a first receiver circuit trace 1.111 in the first layer A, which is arranged in the second layer B there. In addition, the second conductor trace 1.142 arranged in the second layer B crosses a first receiver circuit trace 1.111, which is arranged in the first layer A there. The first and second conductor traces 1.141, 1.142 extend in these subsections up to vias 1.1411, 1.1412, where the first and second conductor traces 1.141, 1.142 change from the first layer A to the second layer B of the printed circuit board 1.1 or vice versa. Subsequently, extending further to the right in FIG. 7, the first and second conductor trace 1.141, 1.142 are again oriented parallel to the respective first receiver circuit trace 1.111, in which the parallelism refers to the respective first receiver circuit trace 1.111 in the respective same layer A, B in which the first and second conductor traces 1.141, 1.142 are located. The first and second conductor traces 1.141, 1.142 extend in a third section S3 where they are arranged one above the other.

FIG. 2 is a top view of the scale element 2, which is disk-shaped. The scale element 2 includes a carrier, which may be formed of an epoxy resin, on which two graduation tracks 2.1, 2.2 are arranged. The graduation tracks 2.1, 2.2 are annular and concentric with respect to the axis R with different diameters on the carrier. The graduation tracks 2.1, 2.2 include graduation structures, each including a periodic sequence of alternately arranged electrically conductive graduation areas 2.11, 2.21 and non-conductive graduation areas 2.12, 2.22. For example, copper is applied to the carrier as the material for the electrically conductive graduation areas 2.11, 2.21. In the non-conductive graduation areas 2.12, 2.22, on the other hand, no layer is applied to the carrier. With the arrangement having two graduation tracks 2.1, 2.2, the angular position of the scale element 2 can be determined absolutely. The outermost graduation track 2.1 of the scale element 2 has the greater number of graduation areas 2.11, 2.12 along a circumferential line, so that the greatest resolution with respect to the measurement of the angular position can be achieved.

In the assembled state, the scanning element 1 and the scale element 2 are opposite one another with an axial distance or an air gap, so that when there is a relative rotation between the scale element 2 and the scanning element 1, a signal depending on the respective angular position can be generated in each of the receiver circuit traces 1.111, 1.121 by induction effects. A prerequisite for the formation of corresponding signals is that the excitation circuit traces 1.18, 1.19 generate a time-varying electromagnetic excitation field in the area of the respective scanned graduation structures. For example, the excitation circuit traces 1.18, 1.19 include a plurality of planar-parallel current-carrying individual conductive traces. The electronic circuit of the scanning element 1 operates not only as an evaluation device, but also as an excitation control device under whose control the excitation current is generated or produced, which flows through the excitation circuit traces 1.18, 1.19. Thus, the excitation circuit traces 1.18, 1.19 are supplied with current by one and the same excitation control device via the connecting line 1.14. The first excitation circuit trace 1.18 and the second excitation circuit trace 1.19 are electrically connected in series.

If the excitation circuit traces 1.18, 1.19 are supplied with current, a tubular or cylindrical electromagnetic field is formed around them. The field lines of the resulting electromagnetic field extend around the excitation circuit traces 1.18, 1.19, and the direction of the field lines depends on the direction of the current in the excitation circuit traces 1.18, 1.19. Eddy currents are induced in the area of the conductive partial areas 2.11, 2.21, so that a modulation of the field is achieved that is dependent on the angular position. Accordingly, through the receiver tracks 1.11, 1.12, the relative angular position can be measured. The receiver circuit traces 1.111, 1.121 are arranged within their receiver track 1.11, 1.12 such that they each provide signals phase-shifted by 90°, so that the direction of rotation can also be determined. The signals generated by the receiver tracks 1.11, 1.12 are further processed by an evaluation circuit.

Figure 8:
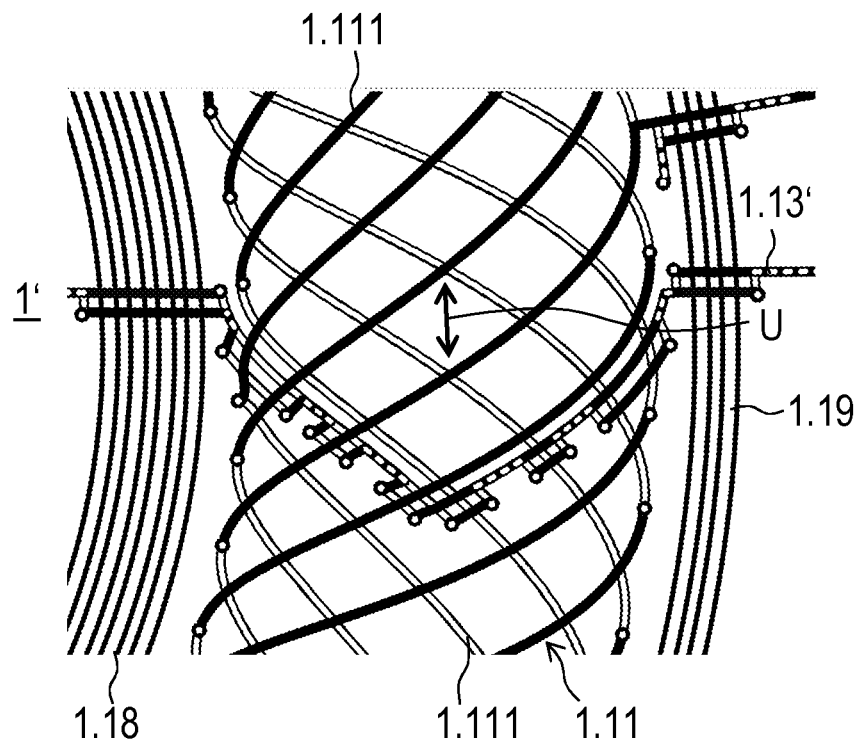
FIG. 8 is an enlarged view of a scanning element with a connecting line.
Figure 9:
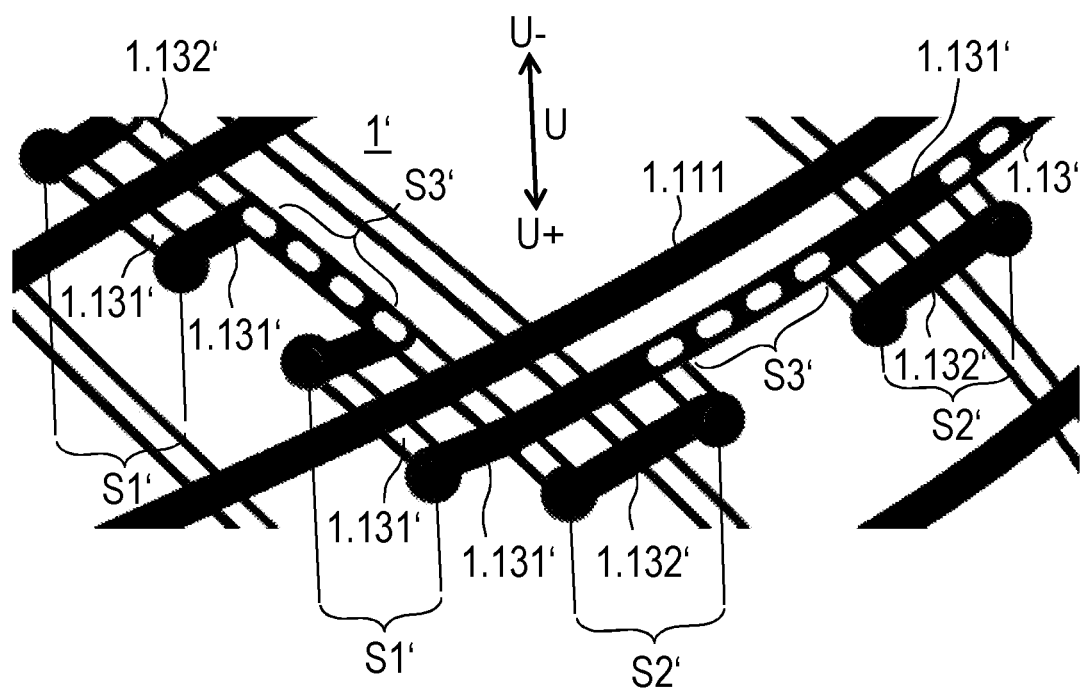
FIG. 9 is an enlarged view of the connecting line.

FIGS. 8 and 9 illustrate a connecting line 1.13' that includes a first conductor trace 1.131' and a second conductor trace 1.132'. The first conductor trace 1.131' is electrically connected at one point to the second receiver circuit trace 1.121, and the second conductor trace 1.132' is electrically connected at another point to the second receiver circuit trace 1.121. In addition, the scanning element 1' also includes another connecting line to the excitation circuit trace 1.18.

In a plurality of first sections S1' (e.g., three sections S1') of the connecting line 1.13', the first conductor trace 1.131' is arranged offset from the second conductor trace 1.132' in the positive measuring direction U+. For example, the first sections S1' are located adjacent to one another over the path of the connecting line 1.13'. In a plurality of second sections S2' of the connecting line 1.13', the second conductor trace 1.132' is arranged offset from the first conductor trace 1.131' in the positive measuring direction U+. The second sections S2' are arranged adjacent to one another. Accordingly, a third section S3', in which the conductor traces 1.131', 1.132' are located one above the other, is located between two first sections S1'. A third section S3' is located between two second sections S2'.

By using the scanning elements 1, 1' described herein, it is possible to increase the measuring accuracy of the position measuring device because, on the one hand, no gaps are required in a receiver track and, on the other hand, interference in the measuring signals is negligible due to the configuration of the connecting conductive traces 1.13, 1.14, 1.13'.

What is claimed is:

1. A scanning element for an inductive position measuring device for measuring a position along a measuring direction, comprising:
    a printed circuit board including:
        a first layer;
        a second layer;
        a first receiver track that includes a first receiver circuit trace;

a connecting line that includes a first conductor trace and a second conductor trace, the connecting line crossing the first receiver track; and (a) a second receiver track that includes a second receiver circuit trace, the first receiver track being electrically connected at a first point to the second receiver circuit trace, the second receiver track being electrically connected at a second point to the second receiver circuit trace; or (b) a first excitation circuit trace, the first conductor trace being electrically connected at a first point to the first excitation circuit trace, and the second conductor trace being electrically connected at a second point to the first excitation circuit trace;

wherein, in at least one first section of the connecting line, the first conductor trace is arranged offset to the second conductor trace in a positive direction of the measuring direction; and wherein, in at least one second section of the connecting line, the second conductor trace is arranged offset to the first conductor trace in the positive direction of the measuring direction.

2. The scanning element according to claim 1, wherein the first receiver circuit trace in the first section and/or in the second section is parallel to the first conductor trace and/or to the second conductor trace in sections.

3. The scanning element according to claim 1, wherein, in at least one third section of the connecting line, the first conductor trace in the first layer and the second conductor trace in the second layer are arranged one above another.

4. The scanning element according to claim 1, wherein, in the first section and/or in the second section, the first conductor trace and the second conductor trace are parallel in sections.

5. The scanning element according to claim 4, wherein the first receiver circuit trace is arranged between the parallel-extending first and second conductor traces in a same layer as the conductor traces.

6. The scanning element according to claim 1, wherein paths of the first conductor trace and the second conductor trace change from the first layer to the second layer in the first section and/or in the second section.

7. The scanning element according to claim 1, wherein along a subsection in the first section, (a) the first conductor trace and the first receiving conductor path are arranged in the first layer, and (b) the first conductor trace is parallel to the first receiver circuit trace.

8. The scanning element according to claim 7, wherein the first receiver track includes a further first receiver circuit trace arranged in the first section in the second layer, the first conductor trace crossing the further first receiver circuit trace in the subsection.

9. The scanning element according to claim 1, wherein the printed circuit board includes exactly two layers.

10. The scanning element according to claim 1, wherein the printed circuit board includes (a) a second receiver track having a second receiver circuit trace, the first receiver track in the first layer being electrically connected at a first point to the second receiver circuit trace, the second receiver track being electrically connected at a second point in the second layer to the second receiver circuit trace, or (b) a first excitation circuit trace, the first conductor trace being electrically connected at a first point in the first layer to the first excitation circuit trace, the second conductor trace being electrically connected at a second point in the second layer to the first excitation circuit trace.

11. The scanning element according to claim 1, further comprising a substrate, the printed circuit board being arranged on the substrate.

12. The scanning element according to claim 11, wherein the substrate is formed of a metallic material.

13. The scanning element according to claim 1, wherein the first receiver track and the second receiver track are curved about an axis, the first receiver track being arranged radially outwardly relative to the second receiver track with respect to the axis.

14. The scanning element according to claim 13, wherein the first receiver track is arranged around the axis over 3600 without any gaps.

15. The scanning element according to claim 1, wherein the position measuring device is arranged a linear position measuring device, the measuring direction extending in a linear longitudinal direction.

16. The scanning element according to claim 1, wherein the position measuring device is arranged as an angular position measuring device, the measuring direction extending in a circumferential direction about an axis of rotation.

17. The scanning element according to claim 1, wherein the first receiving conductor path and/or the second receiver circuit trace is sinusoidal.

18. The scanning element according to claim 17, wherein the first receiving conductor path has a first period length and the second receiving conductor path has a second period length, the first period length being different from the second period length.

19. The scanning element according to claim 17, wherein a sinusoidal period of the first receiving conductor path is offset relative to a sinusoidal period of the second receiving conductor path.

20. An inductive position measuring device for measuring a position along a measuring direction, comprising:
a scale element; and
a scanning element including a printed circuit board, the printed circuit board including:
a first layer;
a second layer;
a first receiver track that includes a first receiver circuit trace;
a connecting line that includes a first conductor trace and a second conductor trace, the connecting line crossing the first receiver track; and
(a) a second receiver track that includes a second receiver circuit trace, the first receiver track being electrically connected at a first point to the second receiver circuit trace, the second receiver track being electrically connected at a second point to the second receiver circuit trace; or (b) a first excitation circuit trace, the first conductor trace being electrically connected at a first point to the first excitation circuit trace, and the second conductor trace being electrically connected at a second point to the first excitation circuit trace;

wherein, in at least one first section of the connecting line, the first conductor trace is arranged offset to the second conductor trace in a positive direction of the measuring direction;

wherein, in at least one second section of the connecting line, the second conductor trace is arranged offset to the first conductor trace in the positive direction of the measuring direction; and wherein the scale element is arranged spaced apart from the printed circuit board in a direction oriented orthogonal to the measuring direction.

\* \* \* \* \*